United States Patent
Basile

(10) Patent No.: US 7,958,162 B2
(45) Date of Patent: Jun. 7, 2011

(54) METHOD AND SYSTEM FOR GENERATING ANALOGOUS FICTIONAL DATA FROM NON-FICTIONAL DATA

(75) Inventor: Ryan M. Basile, Shoreline, WA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/549,470

(22) Filed: Aug. 28, 2009

(65) Prior Publication Data

US 2009/0319520 A1 Dec. 24, 2009

Related U.S. Application Data

(63) Continuation of application No. 12/135,093, filed on Jun. 6, 2008, now abandoned.

(51) Int. Cl.
*G06F 7/00* (2006.01)
*G06F 7/04* (2006.01)
*G06Q 20/00* (2006.01)

(52) U.S. Cl. ............................. 707/804; 726/26; 705/74

(58) Field of Classification Search .................. 707/687, 707/756, 803, 804, 809, 776, 796, 999.101; 705/74

See application file for complete search history.

(56) References Cited

U.S. PATENT DOCUMENTS

| | | | |
|---|---|---|---|
| 6,765,569 B2 | 7/2004 | Neumann et al. | |
| 7,158,979 B2 * | 1/2007 | Iverson et al. | 707/741 |
| 7,509,684 B2 * | 3/2009 | McDonald et al. | 726/26 |
| 2001/0037316 A1 * | 11/2001 | Shiloh | 705/74 |
| 2002/0145573 A1 | 10/2002 | Cheng | |
| 2002/0169793 A1 | 11/2002 | Sweeney | |
| 2003/0167275 A1 * | 9/2003 | Rjaibi | 707/101 |
| 2003/0208457 A1 * | 11/2003 | Iyengar | 707/1 |
| 2006/0080554 A1 | 4/2006 | McDonald et al. | |
| 2006/0123462 A1 * | 6/2006 | Lunt et al. | 726/1 |
| 2007/0038944 A1 | 2/2007 | Carignano et al. | |
| 2007/0255704 A1 | 11/2007 | Beak et al. | |
| 2008/0103794 A1 | 5/2008 | Pettiross et al. | |
| 2008/0140616 A1 | 6/2008 | Encina et al. | |
| 2008/0189316 A1 * | 8/2008 | Otsuka | 707/102 |
| 2008/0240425 A1 * | 10/2008 | Rosales et al. | 380/28 |
| 2008/0310707 A1 | 12/2008 | Kansal et al. | |
| 2009/0037453 A1 | 2/2009 | Kemmler | |
| 2009/0307240 A1 | 12/2009 | Basile | |

OTHER PUBLICATIONS

Samarati, P., Protecting Respondents' Identities in Microdata Release, IEEE, vol. 13, No. 6, Nov./Dec. 2001.*

(Continued)

*Primary Examiner* — Robert Timblin
(74) *Attorney, Agent, or Firm* — Erin C. Ming; SVL IP Law

(57) ABSTRACT

A method and system for generating analogous fictional data from non-fictional data, is provided. One implementation involves recording non-fictional data, scoring the non-fictional data in terms of occurrence percentile, obtaining a set of user-configurations that represents a likeness range between non-fictional data and corresponding fictional data, based on the scores and the user-configurations, generating analogous fictional data from the non-fictional data, and comparing hash values for the fictional data with hash values for the non-fictional data to determine matches, and in case of matches, generating analogous fictional data from the non-fictional data based on the scores and incrementally lowered likeness range, whereby entire records of fictional data are generated based on entire records of non-fictional data, wherein the fictional data is consistent with the non-fictional data.

21 Claims, 8 Drawing Sheets

OTHER PUBLICATIONS

Sweeney, Latanya, Datafly: A System for Providing Anonymity in Medical Data, Database Security XI, Editors: T.Y. Lin and Shelly Qian, 1998.*

Latanya.S, k -Anonymity: a model for protecting privacy, international journal on uncertainity, Fuzziness and knowledge-based system 10(5), 2002, pp. 1-14.*

Yehuda Lindell , Benny Pinkas, Privacy Preserving Data Mining, Proceedings of the 20th Annual International Cryptology Conference on Advances in Cryptology, p. 36-54, Aug. 20-24, 2000.*

Fuller, Arthur. "Intelligent database Design Using Hash Keys". Feb. 17, 2006. http://www.simple-talk.com/sql/t-sql-programming/intelligent-database-design-using-hash-keys/.*

Adam Meyerson, Ryan Williams. "General k -Anonymization is Hard." Mar. 2003. CMU-CS-03-113. School of Computer Science. Carnegie Mellon University.*

Dasseni et al., "Hiding Association Rules by Using Confidence and Support," Lecture Notes in Computer Science; vol. 2137, Proceedings of the 4th International Workshop on Information Hiding, pp. 369-383 (1-13) 2000.

Edgar, Dale, "Data Sanitization Techniques A Net 2000 Ltd. White Paper," Oct. 15, 2004.

Li et al., "MICF: An Effective Sanitization Algorithm for Hiding Sensitive Patterns on Data Mining," Advanced Engineering Informatics vol. 21, Issue 3, Jul. 2007, pp. 269-280.

Clifton et al., "Security and Privacy Implications of Data Mining," In ACM SIGMOD Workshop on Research Issues on Data Mining and Knowledge Discovery, (5 pages) dated 1996.

Bishop et al., "How to Sanitize Data," Proceedings of the 13th IEEE International Workshops on Enabling Technologies: Infrastructure for Collaborative Enterprises, pp. 217-222, Year of Publication 2004.

Atallah, M, et al., "Disclosure Limitation of Sensitive Rules," In Proceedings of KDEX '99, Chicago, IL, 1999.

Oliveira, Stanley et al., "Protecting Sensitive Knowledge by Data Sanitization," In Proceedings of the 3rd IEEE International Conference on Data Mining (2003).

* cited by examiner

2

METHOD AND SYSTEM FOR GENERATING ANALOGOUS FICTIONAL DATA FROM NON-FICTIONAL DATA

CROSS-REFERENCE TO RELATED APPLICATIONS

This application is a continuation of U.S. patent application Ser. No. 12/135,093, entitled "Method and System for Generating Analogous Fictional Data From Non-Fictional Data" and filed Jun. 6, 2008, the disclosure of which is incorporated herein by reference in its entirety.

BACKGROUND OF THE INVENTION

1. Field of the Invention

The present invention relates generally to data manipulation and in particular to converting real-world (non-fictional) data to fictional data.

2. Description of the Related Art

With the proliferation of electronic data, securing confidential data among general electronic data has become more important. Existing approaches generate data randomly or based on predefined manipulation rules or substitution tables. The algorithms are specific to certain financial institution data, such as names, social security numbers, etc. Other approaches obfuscate data based on custom sanitization methods. The sanitized data can have some data that is the same, and some data that is completely random. Yet other approaches create only population specific data from data dictionaries based on a population description which contains the population number and how many of the population individuals are related. The data dictionaries values have no cross-relation, whereby names, addresses, and other data are chosen at random from the individual name, address, and other data dictionaries. Further, the existing data check for generated data is only run against previously generated data, and not actual population data.

BRIEF SUMMARY OF THE INVENTION

The invention provides a method and system for generating analogous fictional data from non-fictional data. One embodiment involves recording non-fictional data, scoring the non-fictional data in terms of occurrence percentile, obtaining a set of user-configurations that represents a likeness range between non-fictional data and corresponding fictional data, based on the scores and the user-configurations, generating analogous fictional data from the non-fictional data, and comparing hash values for the fictional data with hash values for the non-fictional data to determine matches, and in case of matches, generating analogous fictional data from the non-fictional data based on the scores and incrementally lowered likeness range, whereby entire records of fictional data are generated based on entire records of non-fictional data, wherein the fictional data is consistent with the non-fictional data.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

Other aspects and advantages of the present invention will become apparent from the following detailed description, which, when taken in conjunction with the drawings, illustrate by way of example the principles of the invention.

DETAILED DESCRIPTION OF THE INVENTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

A method and system for generating analogous fictional data from non-fictional data, is provided. One embodiment involves recording non-fictional data, scoring the non-fictional data in terms of occurrence percentile, obtaining a set of user-configurations that represents a likeness range between non-fictional data and corresponding fictional data, based on the scores and the user-configurations, generating analogous fictional data from the non-fictional data, and comparing hash values for the fictional data with hash values for the non-fictional data to determine matches, and in case of matches, generating analogous fictional data from the non-fictional data based on the scores and incrementally lowered likeness range, whereby entire records of fictional data are generated based on entire records of non-fictional data, wherein the fictional data is consistent with the non-fictional data.

Figure 1:
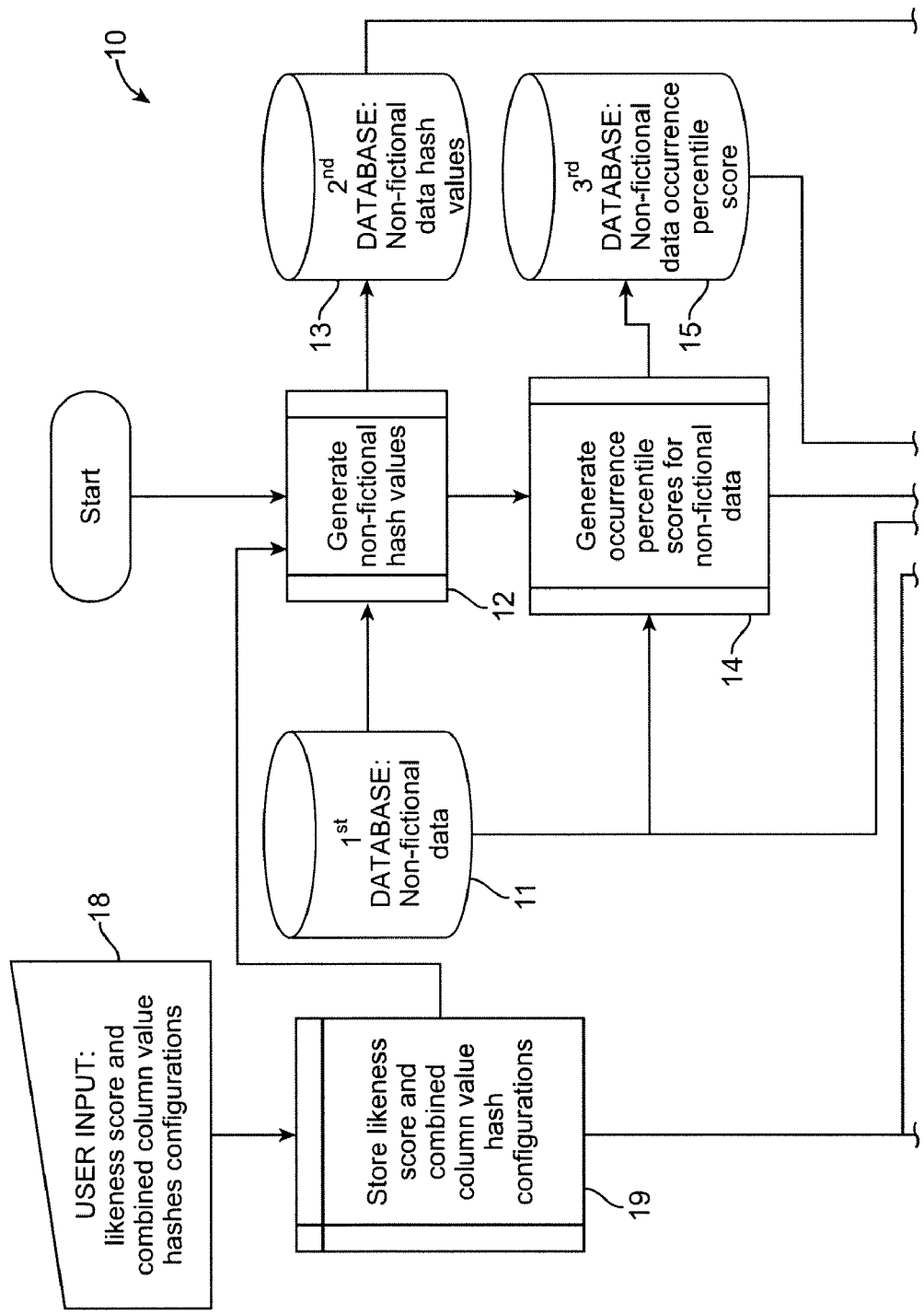
FIG. 1 shows a functional block diagram of a system implementing a preferred embodiment of the present invention.
Figure 1:
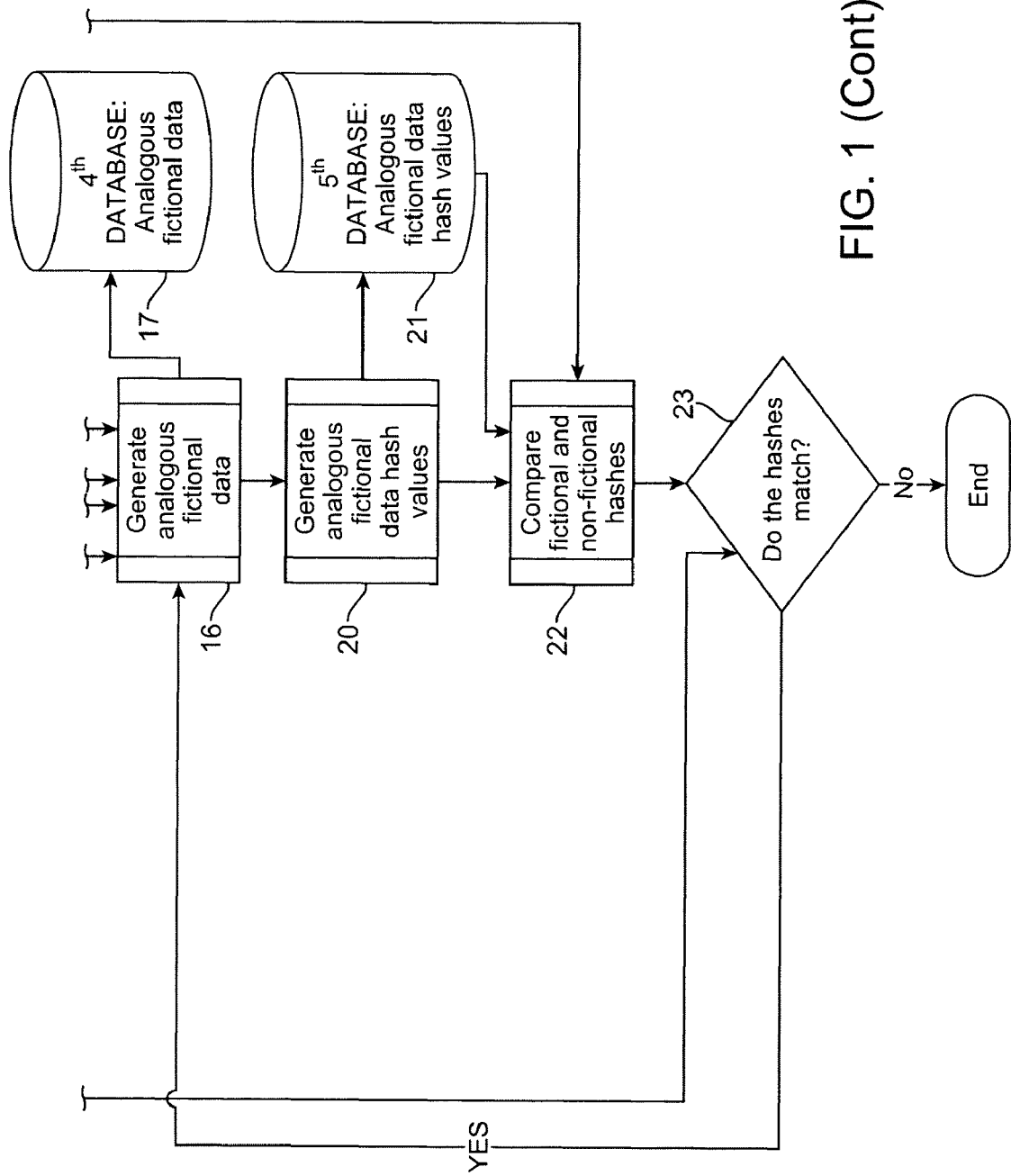

FIG. 1 shows a functional block diagram of a system 10 implementing an embodiment of the invention. The system generates real-world analogous fictional data for any number of uses. In one example this is accomplished by recording and scoring existing real-world (i.e., non-fictional) data, and then based on the scores and a set of user-configurations, generating analogous fictional data using the real-world data. The generated data is very close to actual real-world non-fictional data, without actually being real-world data. This is beneficial because fictional data should be as similar to real-world data as possible for the fictional data to be of productive use.

Preferably, the system generates entire records of fictional data based on the entire records of the actual real-world data. This is implemented by scoring and using the occurrence values of a set of existing real-world data to generate analogous fictional data. The analogous fictional data is then compared to the existing data to ensure the analogous fictional data does not already exist. This approach may be used for all types of data. The entire record of the analogous fictional data has the same consistency of that of the existing data.

Initially, existing non-fictional data is recorded into a first database 11. In block 12, a hash value is generated for each row of the first database 11 and stored in the second database 13, and hash value is generated for each column value of a row of the first database 11 and stored in the second database 13.

In processing block 14, the data values contained in the individual columns of a row of the first database 11 is analyzed, and a third database 15 (i.e., a scoring reference database) is populated, containing an occurrence percentile score for each column value for each row of the first database. An internal storage process occurs after it is determined if a value already has an occurrence percentile score, during the generation of occurrence percentile scores. It is determined if the column or a row value has an occurrence percentile score, and if it does then it is determined if it is up-to-date. If it is not up-to-date, then that score is updated.

In processing block 16, an analogous fictional data database 17 (fourth database) is populated using the exact schema of the first database 11. The first and fourth databases 11, 17, have the exact same schema and number of rows.

Using an interface provided by a processing block 18, a user configures a certain likeness score variable that will determine the range an occurrence percentile of a column value of a row from the first database 11 can match the column value in the generated row of the fourth database 17. The user is allowed to configure combined column value hashes. This way the user can select multiple column values of a row to combine to create a custom hash so that these column values could create a custom combined column value non-fictional data hash to be compared to the analogous fictional data combined column value hash.

New data for each column value of each row in the fourth database 17 is acquired from the first database 11 after selecting values from the same column of other rows that have the occurrence percentile score closest to or within the range of likeness score variable range provided by the user. If a column of a row value with an occurrence percentile score closest to or within the likeness score variable range is not found, the likeness score is incrementally lowered and the process is repeated until one is found.

In processing block 20 a hash value is generated for each row of the fourth database 17 and stored in a fifth database 21, and a hash value is generated for each column value of a row of the fourth database 17 and stored in the fifth database 21.

Processing block 19 comprises an internal storage step for the user input to be stored in internal storage.

In processing block 22 the hash values from the second and fifth databases 13, 21, are compared to verify that no column values of a row, whole rows, or combined column value hashes match from the first and fourth databases 11, 17. According to processing block 23, if any values match, the process proceeds back to the block 16 are repeated with an incrementally lowered likeness score for those values that match.

Figure 2:
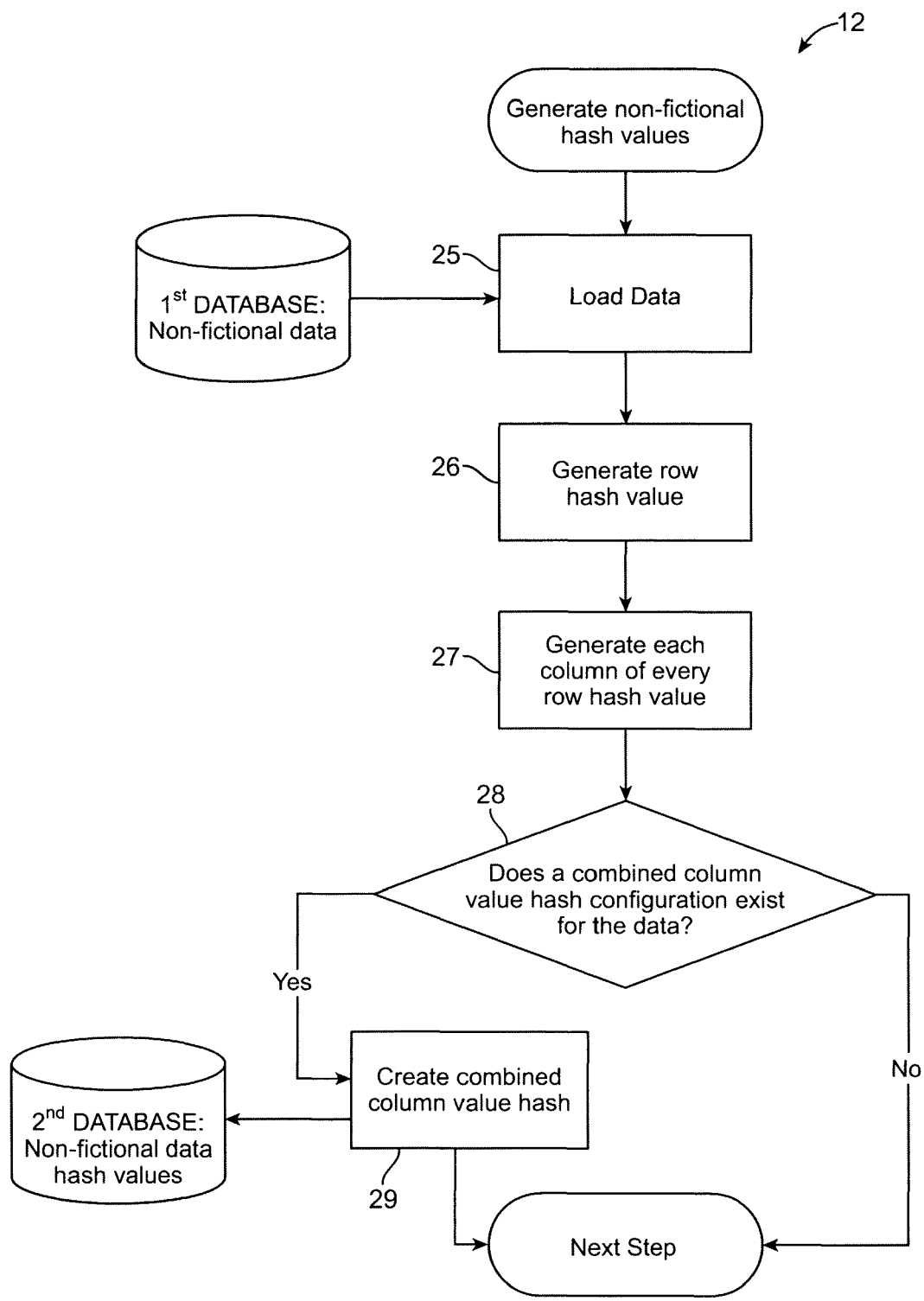
FIG. 2 shows a functional block diagram of a process for generating non-fictional hash values, according to an embodiment of the invention.

FIG. 2 shows an embodiment of the processing block 12, including: loading data from non-fictional data records (step 25), generating a new hash value for the loaded data (step 26), generating each column of every row hash value (step 27), determining if a combined column value hash configuration exists for the data (step 28), if not, proceeding to the next step (process block 14), otherwise, creating combined column hash value and storing in non-fictional data hash values database (step 29).

Figure 3:
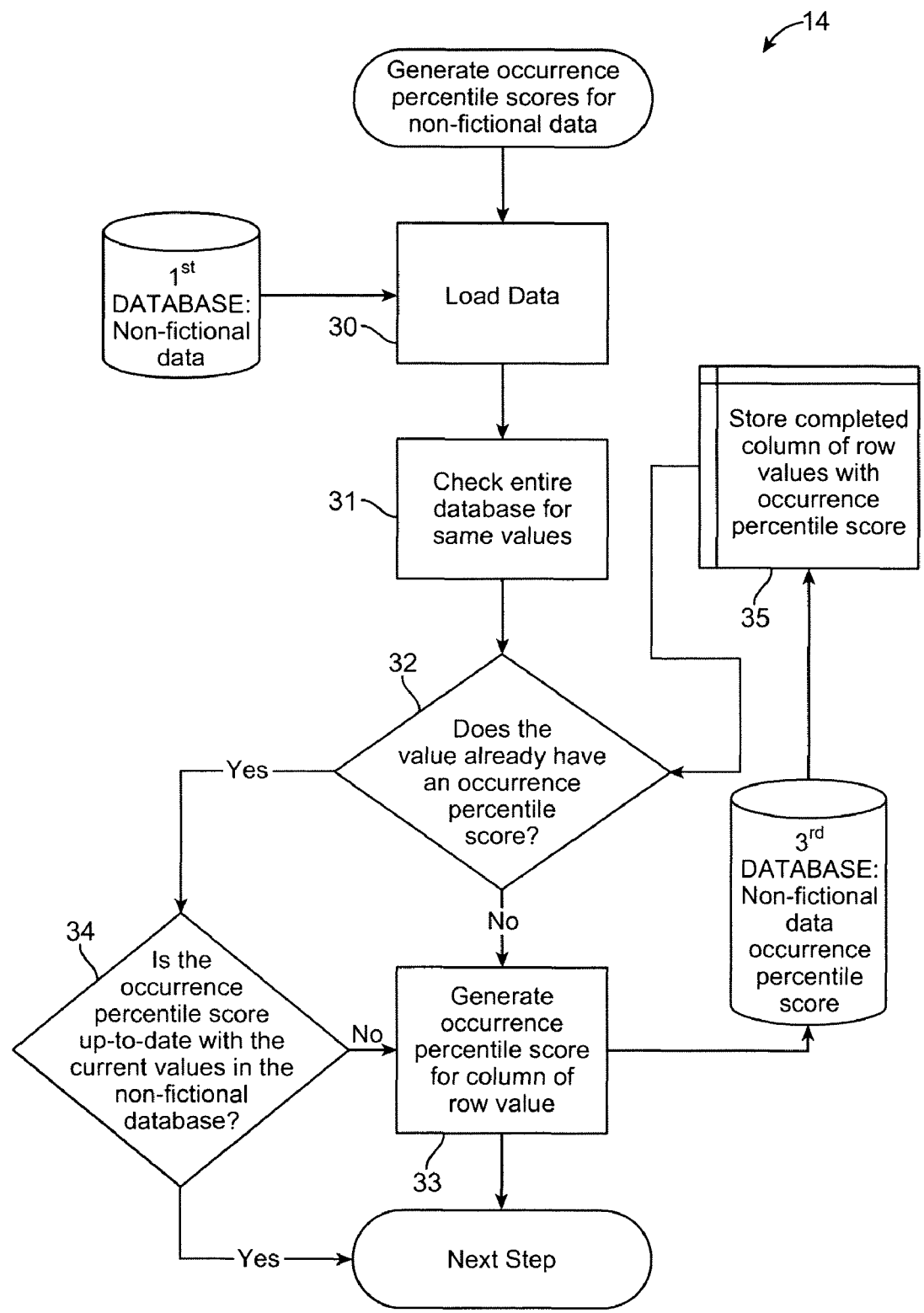
FIG. 3 shows a functional block diagram of a process for generating occurrence percentile scores for non-fictional data, according to an embodiment of the invention.

FIG. 3 shows an embodiment of the processing block 14, including: loading non-fictional data from non-fictional database (step 30), checking entire database for same values (step 31), determining if the values already have an occurrence percentile score (step 32), if not then generating occurrence percentile score for column or row value and storing in non-fictional data occurrence percentile score database (step 33) and proceeding to next step (processing block 16), otherwise, determining if the occurrence percentile score is up to date with the current values in the non-fictional database (step 34), if not, then proceeding to step 33, else proceeding to next step (processing block 16). Further, completed column of row values with occurrence percentile scores are stored (step 35).

Figure 4:
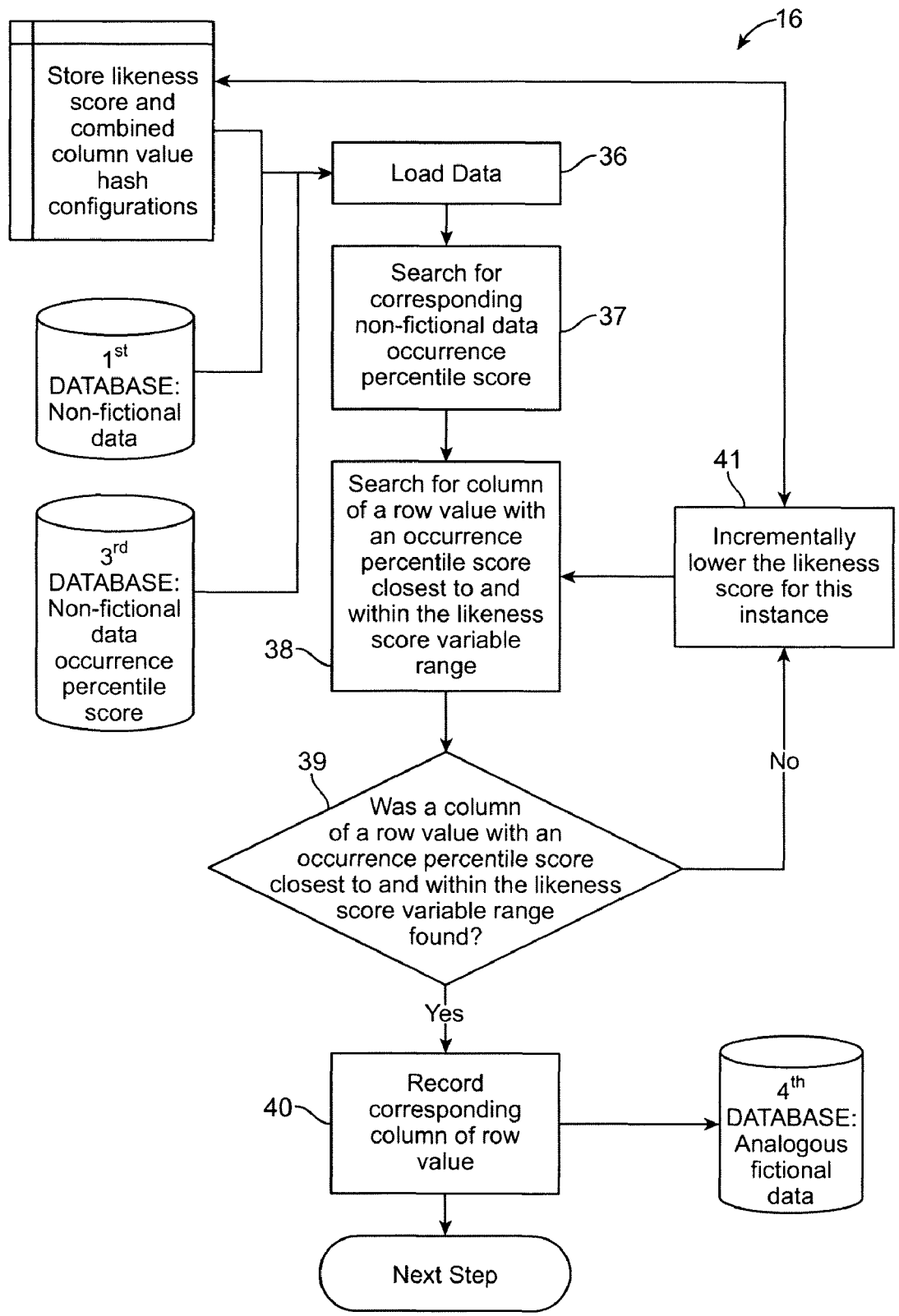
FIG. 4 shows a functional block diagram of a process for generating analogous fictional data, according to an embodiment of the invention.

FIG. 4 shows an embodiment of the process block 16, including: loading non-fictional data and corresponding non-fictional data occurrence percentile score (step 36), searching for corresponding non-fictional data occurrence percentile score (step 37), searching for column of a row value with an occurrence percentile score closest to and within the likeness score variable range (step 38), determining if a column of a row value with an occurrence percentile score closest to and within the likeness score variable range, was found (step 39), if yes, then record corresponding column of row value in analogous fictional database (step 40) and proceed to next step (process block 20), otherwise, incrementally lower the likeness score for this data instance (step 41) and proceed back to step 38.

Figure 5:
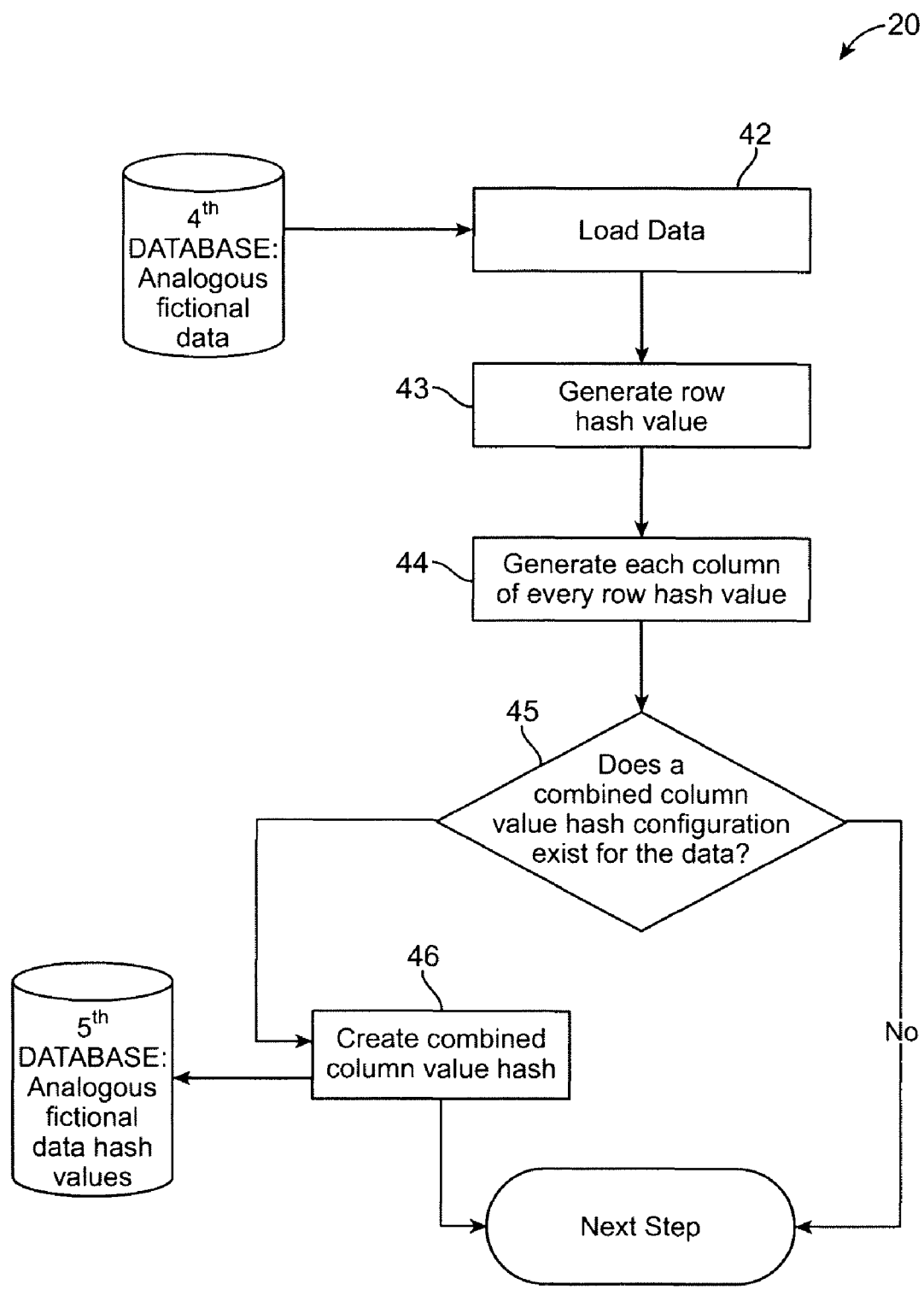
FIG. 5 shows a functional block diagram of a process for generating analogous fictional data hash values, according to an embodiment of the invention.

FIG. 5 shows an embodiment of the process block 20, including: loading data from analogous fictional database (step 42), generating a row hash value (step 43), generating each column of every row hash value (step 44), determining if a combined column value hash configuration exists for the data (step 45), if not then proceeding to next step (process block 22), else creating combined column hash value and storing in analogous fictional data hash values database (step 46)

Figure 6:
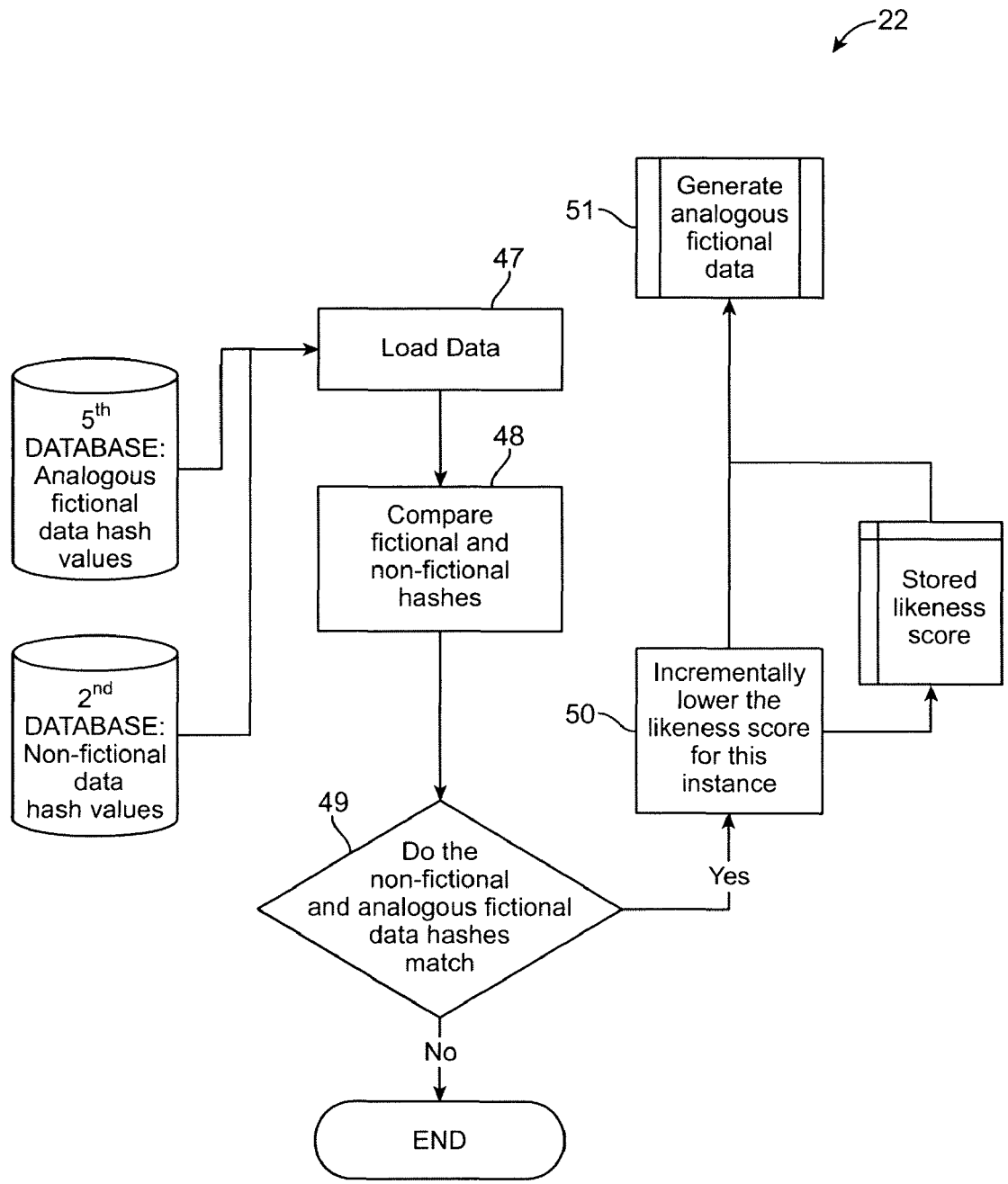
FIG. 6 shows a functional block diagram of a process for comparing fictional and non-fictional hash values in generating analogous fictional data, according to an embodiment of the invention.

FIG. 6 shows an embodiment of the processing block 22, including: loading analogous fictional data hash values and corresponding non-fictional hash values (step 47), comparing fictional and non-fictional hashes (step 48), determining if the non-fictional and analogous fictional data hashes match (step 49), if not then end, else, incrementally lowering the likeness score for this instance (step 50) and generating analogous fictional data (step 51).

Figure 7:
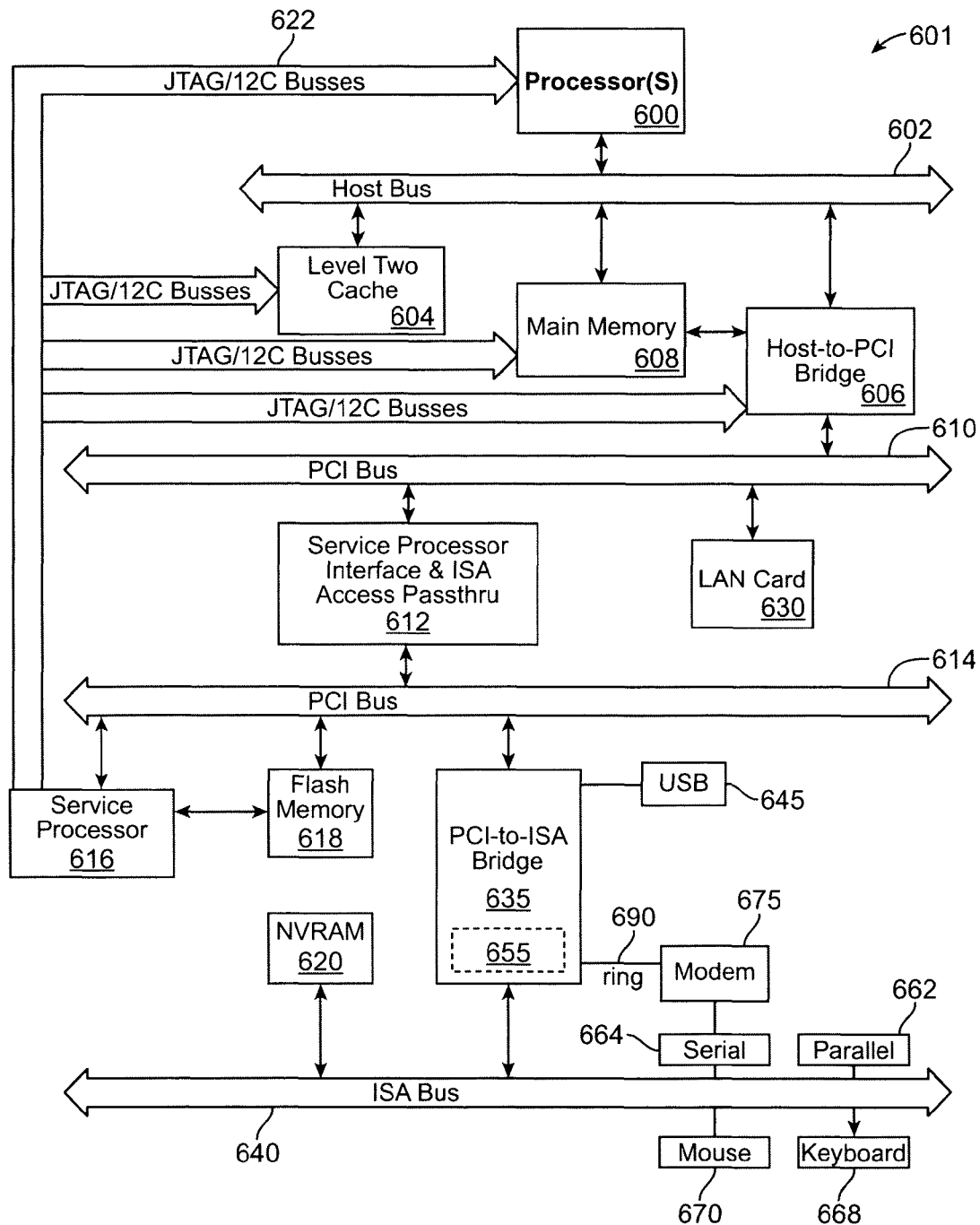
FIG. 7 is a block diagram of a computer system in which the present invention can be implemented.

FIG. 7 illustrates information handling system 601 which is a simplified example of a computer system capable of performing the computing operations described herein. Computer system 601 includes processor 600 which is coupled to host bus 602. A level two (L2) cache memory 604 is also coupled to host bus 602. Host-to-PCI bridge 606 is coupled to main memory 608, includes cache memory and main memory control functions, and provides bus control to handle transfers among PCI bus 610, processor 600, L2 cache 604, main memory 608, and host bus 602. Main memory 608 is coupled to Host-to-PCI bridge 606 as well as host bus 602. Devices used solely by host processor(s) 600, such as LAN card 630, are coupled to PCI bus 610. Service Processor Interface and ISA Access Pass-through 612 provides an interface between PCI bus 610 and PCI bus 614. In this manner, PCI bus 614 is insulated from PCI bus 610. Devices, such as flash memory 618, are coupled to PCI bus 614. In one implementation, flash memory 618 includes BIOS code that incorporates the necessary processor executable code for a variety of low-level system functions and system boot functions.

PCI bus 614 provides an interface for a variety of devices that are shared by host processor(s) 600 and Service Processor 616 including, for example, flash memory 618. PCI-to-ISA bridge 635 provides bus control to handle transfers between PCI bus 614 and ISA bus 640, universal serial bus (USB) functionality 645, power management functionality 655, and can include other functional elements not shown, such as a real-time clock (RTC), DMA control, interrupt support, and system management bus support. Nonvolatile RAM 620 is attached to ISA Bus 640. Service Processor 616 includes JTAG and I2C busses 622 for communication with processor(s) 600 during initialization steps. JTAG/I2C busses 622 are also coupled to L2 cache 604, Host-to-PCI bridge 606, and main memory 608 providing a communications path between the processor, the Service Processor, the L2 cache, the Host-to-PCI bridge, and the main memory. Service Processor 616 also has access to system power resources for powering down information handling device 601.

Peripheral devices and input/output (I/O) devices can be attached to various interfaces (e.g., parallel interface 662, serial interface 664, keyboard interface 668, and mouse interface 670 coupled to ISA bus 640. Alternatively, many I/O devices can be accommodated by a super I/O controller (not shown) attached to ISA bus 640.

In order to attach the computer system 601 to another computer system to copy files over a network, LAN card 630 is coupled to PCI bus 610. Similarly, to connect computer system 601 to an ISP to connect to the Internet using a telephone line connection, modem 675 is connected to serial port 664 and PCI-to-ISA Bridge 635.

While the computer system described in FIG. 7 is capable of executing the processes described herein, this computer system is simply one example of a computer system. Those skilled in the art will appreciate that many other computer system designs are capable of performing the processes described herein of performing the processes described herein.

The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer, processing device, or any instruction execution system. For the purposes of this description, a computer-usable or computer readable medium can be any apparatus that can contain, store, communicate, or transport the program for use by or in connection with the instruction execution system, apparatus, or device.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A computer-implemented method for generating a second data set from a first data set comprising:

determining an occurrence value for each element of said first data set pertaining to the quantity of occurrences of that element within said first data set;

receiving a similarity value configured by a user indicating a desired similarity between said first and second data sets; and generating said second data set to include elements with said occurrence values for said second data set based on said occurrence values of elements of said first data set and said similarity value, wherein said generating said second data set further includes:

examining said occurrence value of an element in said first data set;

retrieving another element of said first data set with an occurrence value within a range from said occurrence value of said examined element in said first data set, wherein said range is indicated by said similarity value to provide said desired similarity; and substituting said examined element with said retrieved element by placing said retrieved element at a location within said second data set that corresponds to a location of said examined element in said first data set.

2. The method of claim 1, wherein said first data set includes non-fictional data and said second data set includes fictional data.

3. The method of claim 2, wherein entire records of fictional data are generated based on entire records of non-fictional data, and wherein said fictional data is consistent with said non-fictional data.

4. The method of claim 1, further including:

comparing elements of said first and second data sets; and generating new elements for said second data set in response to matching elements with said first data set by adjusting said similarity value for decreased similarity and replacing each matching element in said second data set with another element of said first data set with an occurrence value based on said adjusted similarity value.

5. The method of claim 4, wherein said comparing elements of said first and second data sets further includes:

determining hash values for said first and second data sets; and comparing said hash values of said first and second data sets to determine said matching elements.

6. The method of claim 5, wherein said first and second data sets are stored in respective first and second databases with identical schemas of rows and columns, and said determining said hash values further includes:

determining said hash values for each row and column value of said first and second databases; and selectively determining a hash value from two or more column values selected by a user to produce a combined hash value for said comparison.

7. The method of claim 1, wherein said first and second data sets are stored in identical schemas.

8. A computer system for generating a second data set from a first data set comprising:

at least one storage system for storing a computer program; and at least one processor for processing said computer program to:

determine an occurrence value for each element of said first data set pertaining to the quantity of occurrences of that element within said first data set;

receive a similarity value configured by a user indicating a desired similarity between said first and second data sets; and generate said second data set to include elements with said occurrence values for said second data set based on said occurrence values of elements of said first data set and said similarity value, wherein said generating said second data set further includes:
examining said occurrence value of an element in said first data set;
retrieving another element of said first data set with an occurrence value within a range from said occurrence value of said examined element in said first data set, wherein said range is indicated by said similarity value to provide said desired similarity; and
substituting said examined element with said retrieved element by placing said retrieved element at a location within said second data set that corresponds to a location of said examined element in said first data set.

9. The computer system of claim 8, wherein said first data set includes non-fictional data and said second data set includes fictional data.

10. The computer system of claim 9, wherein entire records of fictional data are generated based on entire records of non-fictional data, and wherein said fictional data is consistent with said non-fictional data.

11. The computer system of claim 8, wherein said processor further processes said computer program to:
compare elements of said first and second data sets; and
generate new elements for said second data set in response to matching elements with said first data set by adjusting said similarity value for decreased similarity and replacing each matching element in said second data set with another element of said first data set with an occurrence value based on said adjusted similarity value.

12. The computer system of claim 11, wherein comparison of elements of said first and second data sets further includes:
determining hash values for said first and second data sets; and
comparing said hash values of said first and second data sets to determine said matching elements.

13. The computer system of claim 12, wherein said first and second data sets are stored in respective first and second databases with identical schemas of rows and columns, and said determining said hash values further includes:
determining said hash values for each row and column value of said first and second databases; and
selectively determining a hash value from two or more column values selected by a user to produce a combined hash value for said comparison.

14. The computer system of claim 8, wherein said first and second data sets are stored in identical schemas.

15. A computer program product for generating a second data set from a first data set, the computer program product comprising:
a computer useable storage medium having computer readable program code embodied therewith, the computer readable program code comprising computer readable program code to:
determine an occurrence value for each element of said first data set pertaining to the quantity of occurrences of that element within said first data set;
receive a similarity value configured by a user indicating a desired similarity between said first and second data sets; and
generate said second data set to include elements with said occurrence values for said second data set based on said occurrence values of elements of said first data set and said similarity value, wherein said generating said second data set further includes:
examining said occurrence value of an element in said first data set;
retrieving another element of said first data set with an occurrence value within a range from said occurrence value of said examined element in said first data set, wherein said range is indicated by said similarity value to provide said desired similarity; and
substituting said examined element with said retrieved element by placing said retrieved element at a location within said second data set that corresponds to a location of said examined element in said first data set.

16. The computer program product of claim 15, wherein said first data set includes non-fictional data and said second data set includes fictional data.

17. The computer program product of claim 16, wherein entire records of fictional data are generated based on entire records of non-fictional data, and wherein said fictional data is consistent with said non-fictional data.

18. The computer program product of claim 15, wherein said computer readable program code further includes computer readable program code to:
compare elements of said first and second data sets; and
generate new elements for said second data set in response to matching elements with said first data set by adjusting said similarity value for decreased similarity and replacing each matching element in said second data set with another element of said first data set with an occurrence value based on said adjusted similarity value.

19. The computer program product of claim 18, wherein comparison of elements of said first and second data sets further includes:
determining hash values for said first and second data sets; and
comparing said hash values of said first and second data sets to determine said matching elements.

20. The computer program product of claim 19, wherein said first and second data sets are stored in respective first and second databases with identical schemas of rows and columns, and said determining said hash values further includes:
determining said hash values for each row and column value of said first and second databases; and
selectively determining a hash value from two or more column values selected by a user to produce a combined hash value for said comparison.

21. The computer program product of claim 15, wherein said first and second data sets are stored in identical schemas.

* * * * *